(12) United States Patent
Sekiguchi et al.

(10) Patent No.: US 7,924,463 B2
(45) Date of Patent: Apr. 12, 2011

(54) IMAGE PROCESSING APPARATUS AND CONTROL METHOD THEREOF

(75) Inventors: Nobuo Sekiguchi, Moriya (JP); Akihito Mori, Toride (JP); Tadaaki Saida, Kashiwa (JP); Keita Takahashi, Abiko (JP)

(73) Assignee: Canon Kabushiki Kaisha (JP)

( * ) Notice: Subject to any disclaimer, the term of this patent is extended or adjusted under 35 U.S.C. 154(b) by 687 days.

(21) Appl. No.: 11/959,983

(22) Filed: Dec. 19, 2007

(65) Prior Publication Data
US 2008/0151278 A1 Jun. 26, 2008

(30) Foreign Application Priority Data
Dec. 26, 2006 (JP) .................. 2006-350493

(51) Int. Cl.
*H04N 1/40* (2006.01)
(52) U.S. Cl. ........................ 358/2.1; 358/515
(58) Field of Classification Search .................. 358/1.9, 358/2.1, 500, 504, 515–522; 399/28, 39
See application file for complete search history.

(56) References Cited

U.S. PATENT DOCUMENTS
7,431,210 B2 * 10/2008 Kikuchi et al. .............. 235/438
2007/0153340 A1 * 7/2007 Itagaki et al. ................ 358/504

FOREIGN PATENT DOCUMENTS
JP 2001-203866 A 7/2001
JP 2004-114343 A 4/2004
JP 2006-229554 A 8/2006

* cited by examiner

*Primary Examiner* — Thomas D Lee
*Assistant Examiner* — Stephen M Brinich
(74) *Attorney, Agent, or Firm* — Rossi, Kimms & McDowell LLP

(57) ABSTRACT

An image processing apparatus comprising an image processing unit configured to execute image processing by selectively using a plurality of image processing patterns, a selecting unit configured to select one of the plurality of image processing patterns according to a user's operation, a determination unit configured to determine whether or not tone correction control has been applied to the image processing pattern selected by the selecting unit, and a notification unit configured to notify, when the determination unit determines that the tone correction control has not been applied yet, a message that advises accordingly.

3 Claims, 13 Drawing Sheets

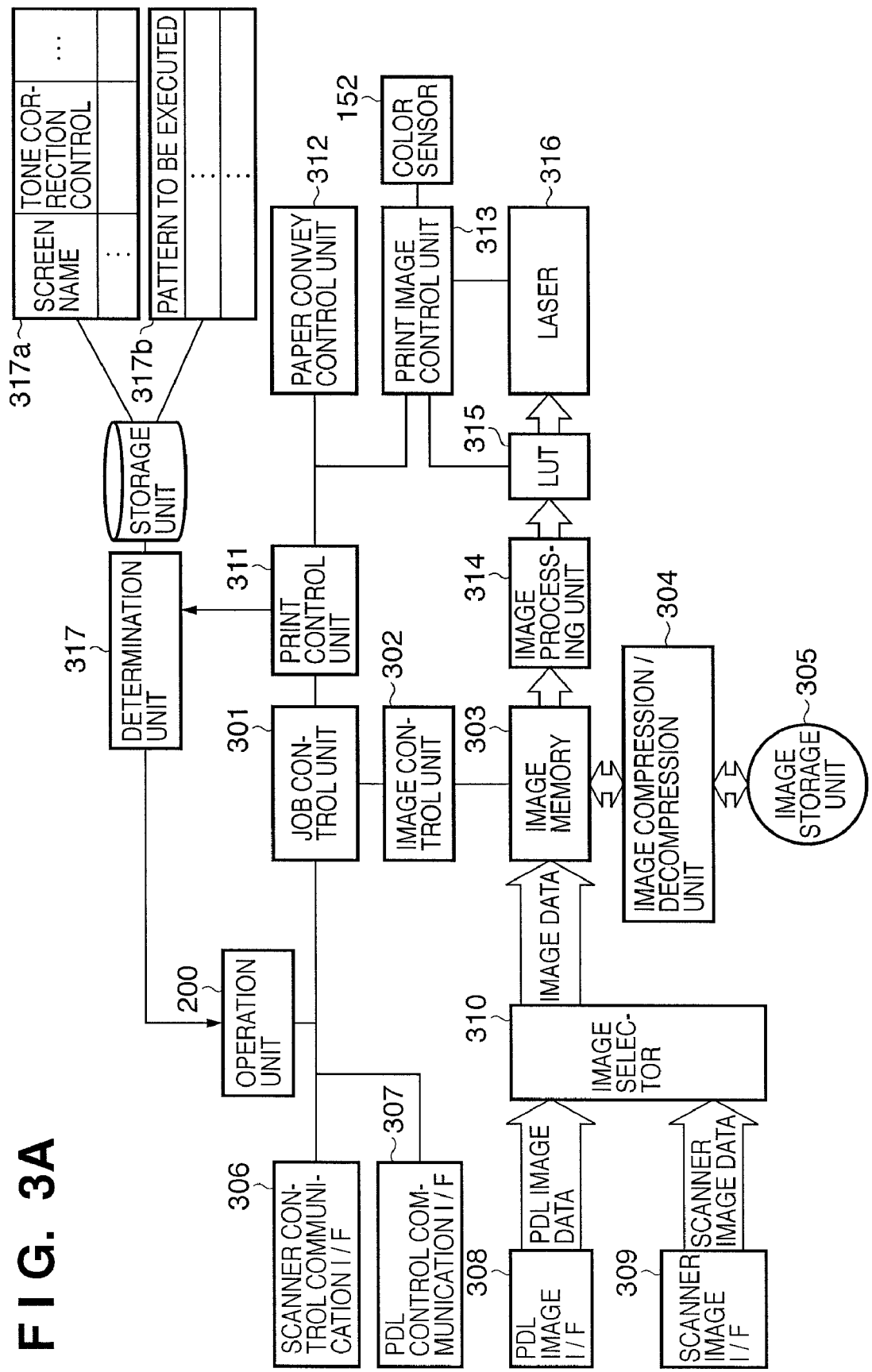

| SCREEN NAME | TONE CORRECTION CONTROL | EXECUTION DATE | ELAPSED TIME PERIOD |
|---|---|---|---|
| SCREEN 1 | EXECUTED | ×(MONTH)△(DAY), 200X(YEAR) | ○○ DAYS |
| SCREEN 2 | NOT EXECUTED | – | – |
| ⋮ | | | |
| SCREEN 9 | EXECUTED | □(MONTH)×(DAY), 200X(YEAR) | △△ DAYS |

| DEVELOPING COLOR | SCREEN PATTERN FOR WHICH TONE CORRECTION CONTROL IS TO BE EXECUTED |
|---|---|
| YELLOW | SCREEN 2 |
| MAGENTA | NONE |
| CYAN | SCREEN 4 |
| BLACK | NONE |

F I G. 4
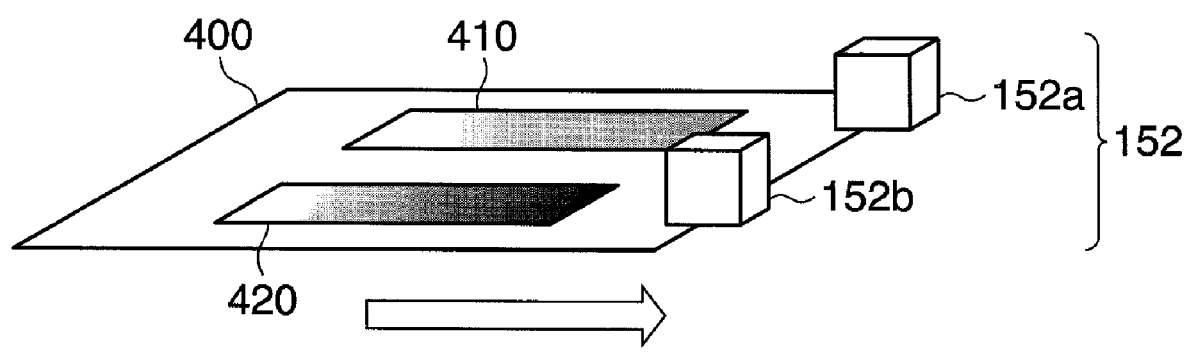

IMAGE PROCESSING APPARATUS AND CONTROL METHOD THEREOF

BACKGROUND OF THE INVENTION

1. Field of the Invention

The present invention relates to an image processing apparatus and control method thereof.

2. Description of the Related Art

Japanese Patent Laid-Open No. 2001-203866 discloses an image processing apparatus, which executes tone correction control for improving the image quality of a multi-tone image. The technique disclosed in Japanese Patent Laid-Open No. 2001-203866 outputs tone pattern images (patch images) of a plurality of densities, scans the patch images on an output path, and applies changes to an image processing unit, thus optimizing image forming conditions.

However, in an image processing apparatus that allows the user to select a plurality of image processing patterns, tone correction control must be done for each image processing pattern. In such an image processing apparatus, when the number of image processing patterns is large, it takes a long period of time to execute the tone correction control for all the image processing patterns. Hence, the tone correction control is applied to only an image processing pattern to be used.

However, when the user selects an image processing pattern which has not been used yet, whether or not to apply the tone correction control to that image processing pattern cannot often be decided (for example, when the user forgets or when a different user selects that pattern). The image processing pattern that has not undergone the tone correction process has settings of factory shipping, and may result in an image with low image quality.

SUMMARY OF THE INVENTION

The present invention provides a technique for easily and reliably executing tone correction control for each image processing pattern.

According to one aspect of the present invention, there is provided an image processing apparatus comprising an image processing unit configured to execute image processing by selectively using a plurality of image processing patterns, a selecting unit configured to select one of the plurality of image processing patterns according to a user's operation, a determination unit configured to determine whether or not tone correction control has been applied to the image processing pattern selected by the selecting unit, and a notification unit configured to notify, when the determination unit determines that the tone correction control has not been applied yet, a message that advises accordingly.

According to another aspect of the present invention, there is provided a control method for an image processing apparatus, which executes image processing by selectively using a plurality of image processing patterns, the method comprising selecting one of the plurality of image processing patterns according to a user's operation, determining whether or not tone correction control has been applied to the image processing pattern selected in the selecting step, and notifying, when it is determined in the determining step that the tone correction control has not been applied yet, a message that advises accordingly.

Further features of the present invention will become apparent from the following description of exemplary embodiments with reference to the attached drawings.

BRIEF DESCRIPTION OF THE DRAWINGS

FIG. 3A is a schematic block diagram showing the control arrangement of the image processing apparatus included in the image processing system shown in FIG. 1.

FIG. 3B shows an example of a database stored in a storage unit of a determination unit shown in FIG. 3A.

FIG. 3C shows an example of a database stored in the storage unit of the determination unit shown in FIG. 3A.

FIG. 4 is a schematic perspective view showing a color sensor arranged on a re-feed path of the image processing apparatus included in the image processing system shown in FIG. 1.

DESCRIPTION OF THE EMBODIMENTS

Figure 1:
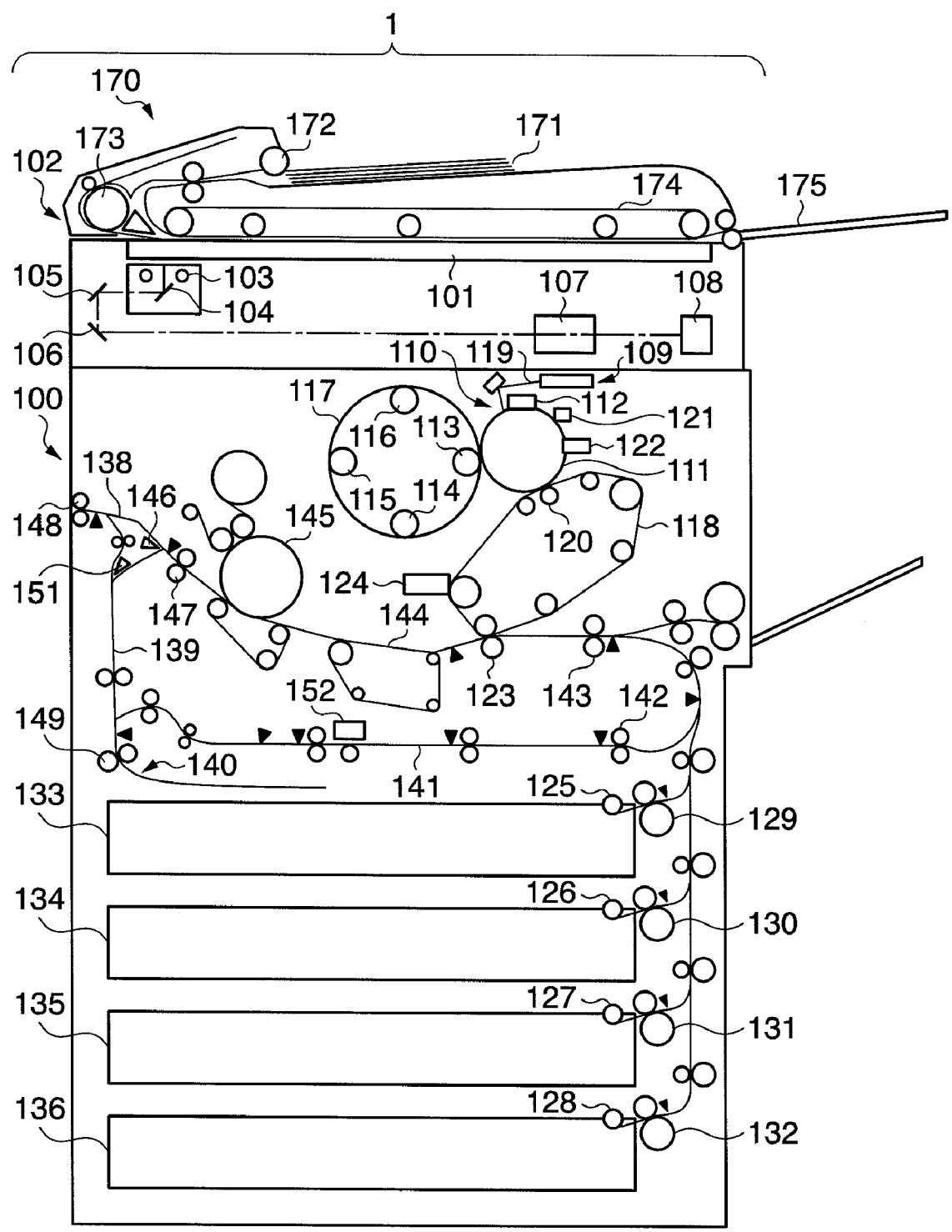
FIG. 1 is a schematic sectional view showing the structure of an image processing system which includes an image processing apparatus according to the present invention.

Preferred embodiments of the present invention will be described hereinafter with reference to the accompanying drawings. Note that the same reference numerals denote the same parts throughout the drawings, and a repetitive description thereof will be avoided.

FIG. 1 is a schematic sectional view showing the structure of an image processing system 1 which includes an image processing apparatus according to the present invention.

As shown in FIG. 1, the image processing system 1 includes an image processing apparatus 100, a platen glass 101 as a document table, and a scanner 102. The scanner 102 includes a document illumination lamp 103, scanning mirrors 104 to 106, lens 107, image sensor unit 108, and the like, and performs reciprocal scans in predetermined directions by a motor (not shown). During the reciprocal scans, reflected light from a document passes through the lens 107 via the scanning mirrors 104 to 106, and forms an image on a CCD sensor of the image sensor unit 108, thereby generating image data from an image on the document.

The image processing system 1 includes an auto document feeder (to be abbreviated as "ADF" hereinafter) 170. The ADF 170 automatically feeds a document to a position where the scanner 102 can scan it. As shown in FIG. 1, the ADF 170 includes a document tray 171, document feed roller 172, document double-side reverse roller 173, document convey belt 174, and document exhaust tray 175. The document tray 171 can carry a maximum of 100 documents. The document feed roller 172 is used to feed documents on the ADF. The document double-side reverse roller 173 is used to scan the two faces of a document fed from the document feed roller 172. The document convey belt 174 conveys a document fed from the document feed roller 172 or document double-side reverse roller 173 onto the platen glass 101. The document convey belt 174 is controlled to stop the document at the scan position, to return a document to the document double-side reverse roller 173 upon scanning the reverse face of the document, and to exhaust the document to the document exhaust tray 175. The document exhaust tray 175 can carry, e.g., a maximum of 100 documents as in the document tray 171.

The image processing system 1 also includes an exposure control unit 109 which includes a laser, polygon scanner, and the like. The exposure control unit 109 emits a laser beam 119 modulated based on an image signal, which is obtained by converting an image into an electrical signal by the image sensor unit 108 and has undergone predetermined image processing, toward a photosensitive drum 111 that faces an image forming region 110.

Around the photosensitive drum 111, a pre-exposure lamp 121, primary charger 112, developer rotary 117, primary transfer roller 120, and cleaning device 122 are arranged. The pre-exposure lamp 121 clears a potential on the photosensitive drum 111. The primary charger 112 applies a high voltage to a wire used to apply a potential to the photosensitive drum 111, thus causing corona discharging. The developer rotary 117 houses developers 113 to 116 that store toners which are used to develop an electrostatic latent image formed on the photosensitive drum 111 by the laser beam 119, and moves the developers 113 to 116 to bring them into contact with the photosensitive drum 111 in turn. The primary transfer roller 120 transfers an image developed on the photosensitive drum 111 onto an intermediate transfer member 118.

The photosensitive drum 111 is rotated by a motor (not shown). The surface of the photosensitive drum 111 is charged to a desired potential by the primary charger 112, and is then irradiated with the laser beam 119 from the exposure control unit 109. As a result, an electrostatic latent image is formed on the photosensitive drum 111. The developer rotary 117 is rotated so that the developer 113 of the first color is brought into contact with the electrostatic latent image on the photosensitive drum 111, and toner stored in the developer 113 is electrostatically attached to the latent image. In this way, a developed toner image is formed on the photosensitive drum 111.

Upon forming a full-color image using the toners of the developers of four colors housed in the developer rotary 117, the toner image of the first color developed on the photosensitive drum 111 is temporarily transferred onto the intermediate transfer member 118 by the primary transfer roller 120. After the toner image of the first color is transferred onto the intermediate transfer member 118, the developer rotary 117 brings the developer 114 of the second color into contact with the photosensitive drum 111. At this time, an electrostatic latent image is formed, so that the leading end of the toner image (developed image) of the first color, which is temporarily transferred onto the intermediate transfer member 118 perfectly matches that of a toner image (developed image) of the second color, which is developed on the photosensitive drum 111, at the position of the primary transfer roller 120. Then, the toner image of the second color is superposed on that of the first color, which is temporarily transferred onto the intermediate transfer member 118.

By repetitively superposing the toner images of the third and fourth colors, a full-color image of four colors is transferred onto the intermediate transfer member 118.

On the other hand, a print sheet is fed from a first, second, third, or fourth paper cassette 133, 134, 135, or 136 via a pickup roller 125, 126, 127, or 128. A print sheet fed from the first, second, third, or fourth paper cassette 133, 134, 135, or 136 is conveyed toward registration rollers 143 by feed rollers 129, 130, 131, or 132. A toner image (non-fixed toner image) on the intermediate transfer member 118 is transferred onto the print sheet conveyed to the vicinity of the registration rollers 143. More specifically, a transfer bias is applied to secondary transfer rollers 123, and the registration rollers 143 are driven, so that the leading end of the image to be transferred matches that of the print sheet, thereby transferring the image onto the print sheet. The recording sheet on which the image is transferred is fed onto a conveyor belt 144.

Note that the residual toner, which is not transferred onto the print sheet by the secondary transfer rollers 123, remains on the intermediate transfer member 118. Then, an intermediate transfer member cleaner 124 starts cleaning of the residual toner. The intermediate transfer member cleaner 124 is detachably arranged. The intermediate transfer member cleaner 124 is controlled to be in contact with the intermediate transfer member 118 immediately before the leading end of the residual toner arrives, and to separate from the intermediate transfer member 118 immediately before the leading end of the toner image of the first color of the next image to be transferred arrives.

Also, since the residual toner which is not transferred onto the intermediate transfer member 118 by the primary transfer roller 120 remains on the photosensitive drum 111, the cleaning device 122 starts cleaning of the residual toner. Upon completion of cleaning of the residual toner, the pre-exposure lamp 121 clears the residual charge on the photosensitive drum 111.

The print sheet on which the toner image (image) on the intermediate transfer member 118 is transferred is conveyed by the conveyor belt 144 to a fixing device 145. The fixing device 145 comprises a heat roller used to heat the print sheet, and a fixing belt used to fix the toner image by pressure. The toner image transferred onto the print sheet is fixed by being compressed and heated by the fixing device 145. The print sheet on which the toner image is fixed (i.e., the print sheet on which the image is formed) is exhausted outside the image processing apparatus 100 via inner exhaust rollers 147 and outer exhaust rollers 148.

As shown in FIG. 1, the image processing system 1 includes an exhaust flapper 146, re-feed rollers 142, color sensor 152, and reverse rollers 149.

The exhaust flapper 146 switches the course of the print sheet to one of a convey path 138 and reverse path 139. In case of double-sided recording (double-sided copying) that forms images on the two faces of a print sheet, the exhaust flapper 146 is moved upward to switch the course of the print sheet conveyed from the inner exhaust rollers 147 from the convey path 138 to the reverse path 139. The traveling direction of the print sheet conveyed to the reverse path 139 is reversed by a double-side reverse unit 140. In this way, the print sheet is guided onto a re-feed path 141 while being reversed. The re-feed rollers 142 are used to re-feed the print sheet conveyed to the re-feed path 141 to the image forming region 110.

The color sensor 152 is arranged on the re-feed path 141, and reads patch images formed on the print sheet whose print surface is reversed by the double-side reverse unit 140.

The outer exhaust rollers 148 are arranged near the exhaust flapper 146, and exhaust the print sheet outside the image processing apparatus 100 after the exhaust flapper 146 switches the course of the print sheet to the convey path 138. Upon reversing and exhausting the print sheet from the image processing apparatus 100, the exhaust flapper 146 is moved upward, and the reverse rollers 149 convey the print sheet onto the reverse path 139 to a position where the trailing end of the print sheet has passed a reverse flapper. The print sheet conveyed to the reverse path 139 is turned upside down by reversing the reverse rollers 149, and is conveyed toward the outer exhaust rollers 148 via a reverse outer exhaust path 151.

Figure 2:
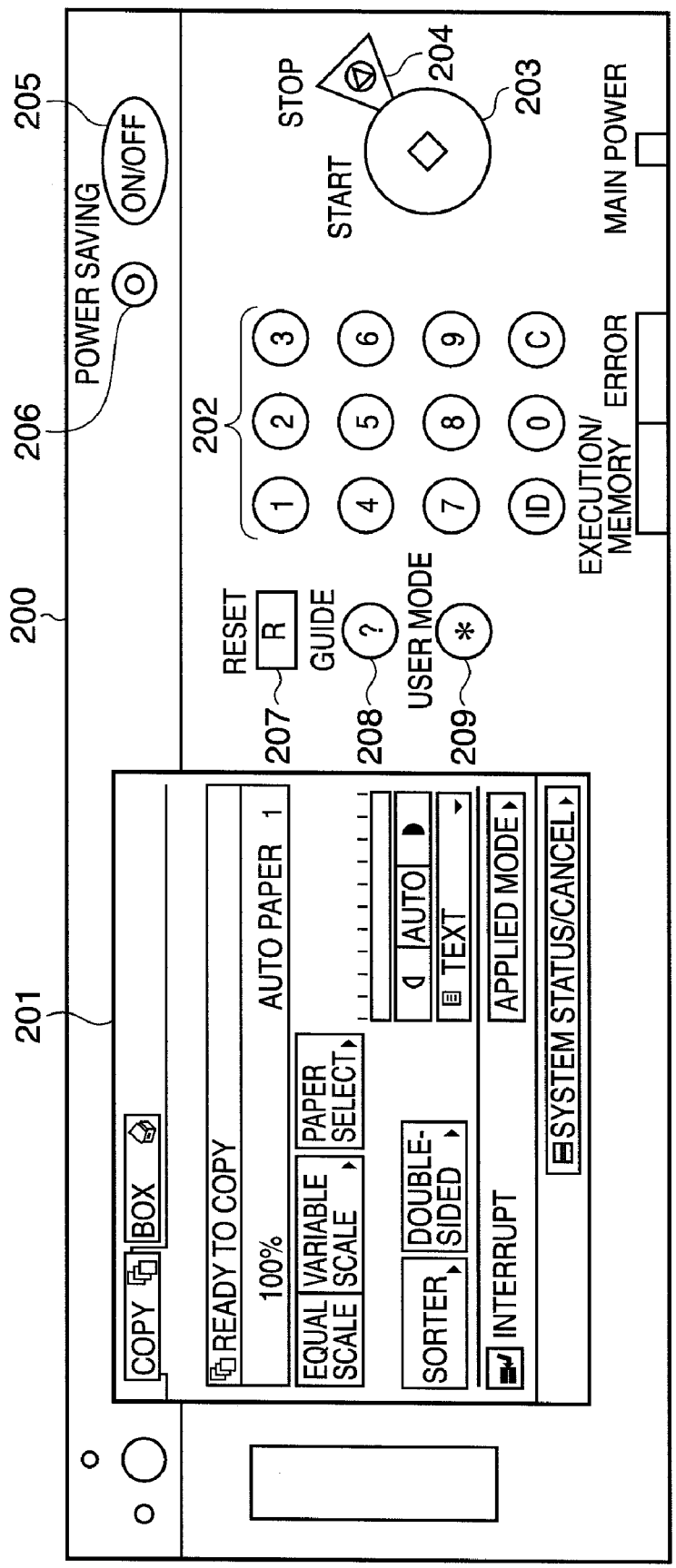
FIG. 2 is a plan view of an operation unit of the image processing apparatus included in the image processing system shown in FIG. 1.

FIG. 2 shows an operation unit 200 of the image processing apparatus 100 included in the image processing system 1 shown in FIG. 1. The operation unit 200 includes a display unit 201, numeric keypad 202, start key 203, stop key 204, software power key 205, power saving mode key 206, reset key 207, guide key 208, and user mode key 209.

The display unit 201 includes an LCD of a touch panel type, which is used to make mode settings and a status display of the image processing apparatus 100. The numeric keypad 202 includes "0" to "9" numeric input keys and a clear key used to revert settings to default values. The start key 203 is selected when the user executes a copy function, scan function, and the like. The stop key 204 is selected when the user wants to cancel jobs of the copy function, a print function, the scan function, and the like. The software power key 205 is used when the user wants to lower the load electric power of a motor and the like of the image processing apparatus 100 but he or she wants to activate a CPU, network, and the like. The power saving mode key 206 is selected when the user sets temperature control of the fixing device 145 and the like. The reset key 207 is used to reset a function set using the display unit 201, numeric keypad 202, and the like to a default value. The guide key 208 is used to display guide messages for the copy function, print function, and scan function, which are set on the display unit 201, and user modes which are displayed and are set/executed by the user mode key 209. The user mode key 209 is used to set default values of the respective functions of the image processing apparatus 100, and to set adjustment modes that allow the user to arbitrarily execute adjustment items such as tone correction and the like. Furthermore, the user mode key 209 is also used to make various network settings and the like such as an IP (Internet Protocol) address and the like.

The user can use the image processing apparatus 100 via the operation unit 200. The operation unit 200 also serves as a selecting unit that allows the user to select a screen pattern as an image processing pattern used in image processing from a plurality of screen patterns according to his or her operation.

FIG. 3A is a schematic block diagram showing the control arrangement of the image processing apparatus 100. The operation unit 200 includes a ROM in which programs required to control the image processing apparatus 100 are written, a RAM in which the programs are mapped, a CPU which executes these programs, and the like. The operation unit 200 is connected to a job control unit 301, which is notified of contents instructed on the operation unit 200. The job control unit 301 generates jobs such as a copy job, scan job, and the like in accordance with an instruction supplied from the operation unit 200. The job control unit 301 is connected to a scanner control communication I/F (interface) 306 as a communication I/F with a CPU (not shown) which controls the scanner 102 that scans a document image. The job control unit 301 is connected to a PDL control communication I/F 307 as a communication I/F with a CPU of a PDL image control unit (not shown) that renders PDL image data sent from a personal computer or the like to a bitmap image. Furthermore, the job control unit 301 is connected to an image control unit 302 which controls image data until image data to be output to a developer unit of the image processing apparatus 100 is generated based on a PDL image or scanner image. Furthermore, the job control unit 301 is connected to a print control unit 311, which forms an image by controlling driving of an exposure unit and the developer unit. In this way, the job control unit 301 controls the overall image processing apparatus 100.

The image control unit 302 makes respective image-related settings according to a job generated by the job control unit 301. In this embodiment, the image control unit 302 sets an image selector 310, and assures, on an image memory 303, an area for storing image data from the image selector 310. The image selector 310 decides which of PDL image data sent from a PDL image I/F 308 and a scanner image sent from a scanner image I/F 309 is valid for the image memory 303 comprising a volatile memory. The image control unit 302 sets an image storage unit 305 which comprises a nonvolatile memory represented by an HDD, and sets to compress bitmap image data from the image memory 303 and to send the compressed data to the image storage unit 305. Furthermore, the image control unit 302 also sets to decompress the compressed image data from the image storage unit 305 and to return the decompressed data to the image memory 303. The image control unit 302 reads out color image data from the image memory and outputs the readout image data to an image processing unit 314, so as to actually develop and print image data. The image processing unit 314 applies desired image processing to image data from the image memory 303. The image processing unit 314 serves as an image processor which executes image processing by selectively using screen patterns as a plurality of image processing patterns.

The print control unit 311 receives image data of respective colors finally output from a color separation unit in accordance with respective settings by the image control unit 302, and outputs an instruction to control lasers 316 of respective colors based on the image data to a print image control unit 313. The print image control unit 313 sets an LUT (Look Up Table) 315 to which the sensitivity characteristics of the photosensitive drum 111 with respect to image data are reflected. The LUT 315 has a function of changing the density of input image data to obtain a desired density when the desired density cannot be obtained due to a change in sensitivity characteristics of the photosensitive drum 111 and changes in laser exposure value and charge amount from the primary charger 112. Note that the image processing apparatus 100 has LUTs 315 for respective colors. Image data via the LUTs 315 are output to the lasers 316, and latent images are formed on the photosensitive drum 111 by the developers 113 to 116.

The print control unit 311 applies tone correction control to a screen pattern as an image processing pattern, which is used by the image processing unit 314 in the image processing, via the color sensor 152 and print image control unit 313. When the print control unit 311 applies the tone correction control to a given screen pattern, it sends information indicating the screen pattern that has undergone the control and the date of execution of that control to a determination unit 317.

The print control unit 311 controls a paper convey control unit 312 and the print image control unit 313 to synchronize with each other so as to transfer a toner image on the intermediate transfer member 118 onto a print sheet fed from one of the paper cassette 113 to 136 and to form an image via the fixing device 145.

The print control unit 311 reads density data of patch images on a print sheet, which is output from the color sensor 152 arranged on the re-feed path 141 shown in FIG. 1.

The determination unit 317 is connected to the operation unit 200 and print control unit 311, and determines whether or not the tone correction control is applied to a screen pattern selected by the operation unit 200. More specifically, the determination unit 317 includes a storage unit which stores a database 317a shown in FIG. 3B, and attains such determination with reference to information in the database 317a. The determination unit 317 generates the database 317a based on information associated with the tone correction control from the print control unit 311. The database 317a includes, for each of a plurality of screen patterns, information indicating whether or not to execute the tone correction control (tone correction control), when the tone correction control was executed (execution date), and how many days elapsed after execution of the tone correction control (elapsed time period). As can be understood from reference to the database 317a shown in FIG. 3B, for, e.g., screen 1, the tone correction control was executed on X (month) □ (day), 200X (year), and ○○ days elapsed after execution. As for screen pattern 2, since tone correction control is not executed, no information about the execution date and elapsed time period is written. The database 317a is prepared for each image processing mode and each developing color, and is rewritten every time tone correction control is applied to a screen pattern. Therefore, the determination unit 317 can determine with reference to the database 317a whether or not the tone correction control was executed for the selected screen pattern. The determination unit 317 can also determine with reference to a database 317b whether or not the tone correction control is required according to the elapsed time period from the previous tone correction control applied to the selected screen pattern. If a long time period has elapsed after the previous tone correction control, the effect of the previous tone correction control applied to that screen pattern deteriorates and may lower the image quality. Therefore, the determination unit 317 can determine according to the elapsed time period after the previous tone correction control whether or not the tone correction control is required. Thus, a drop in image quality due to a long elapsed time period after the previous tone correction control can be prevented. Note that information stored in the database 317a shown in FIG. 7B is merely an example. For example, when the determination unit 317 calculates an elapsed time period after the execution date of the tone correction control, the database 317a need not include information of the elapsed time period. Also, the database 317a may include another information. FIG. 3B shows an example of the database 317a stored in the storage unit of the determination unit 317.

The determination unit 317 generates a database 317b shown in FIG. 3C based on the determination result as to whether or not the tone correction control was executed or whether or not the tone correction control is required, and stores the database 317b in the storage unit. The database 317b includes at least information of a screen pattern for which the determination unit 317 determines that the tone correction control is to be executed. The database 317b is prepared for each image processing mode, and is rewritten every time the tone correction control is executed for a screen pattern (that is, the screen pattern that has undergone the tone correction control is cleared from the database 317b). As can be understood from reference to the database 317b shown in FIG. 3C, for example, as for yellow, screen 2 exists as a screen pattern for which the tone correction control is to be executed. As for magenta, no screen pattern for which the tone correction control is to be executed exists. In this way, since the database 317b temporarily stores a list of a plurality of screen patterns for which the tone correction control is to be executed, the tone correction control can be executed for the plurality of screen patterns at the same time. FIG. 3C shows an example of the database 317b stored in the storage unit of the determination unit 317.

FIG. 4 is a schematic perspective view showing the color sensor 152 arranged on the re-feed path 141 of the image processing apparatus 100 included in the image processing system 1. A method of detecting patch images 410 and 420 formed on a print sheet 400 will be described below with reference to FIG. 4. As shown in FIG. 4, the color sensor 152 includes a color sensor 152a used to read the patch image 410 and a color sensor 152b used to read the patch image 420. The patch images 410 and 420 are formed at predetermined positions on the print sheet 400 so as to be read by the color sensors 152a and 152b. In this embodiment, the print sheet 400 is conveyed in the direction of the arrow shown in FIG. 4, and the color sensors 152a and 152b read the patch images 410 and 420.

Figure 5A:
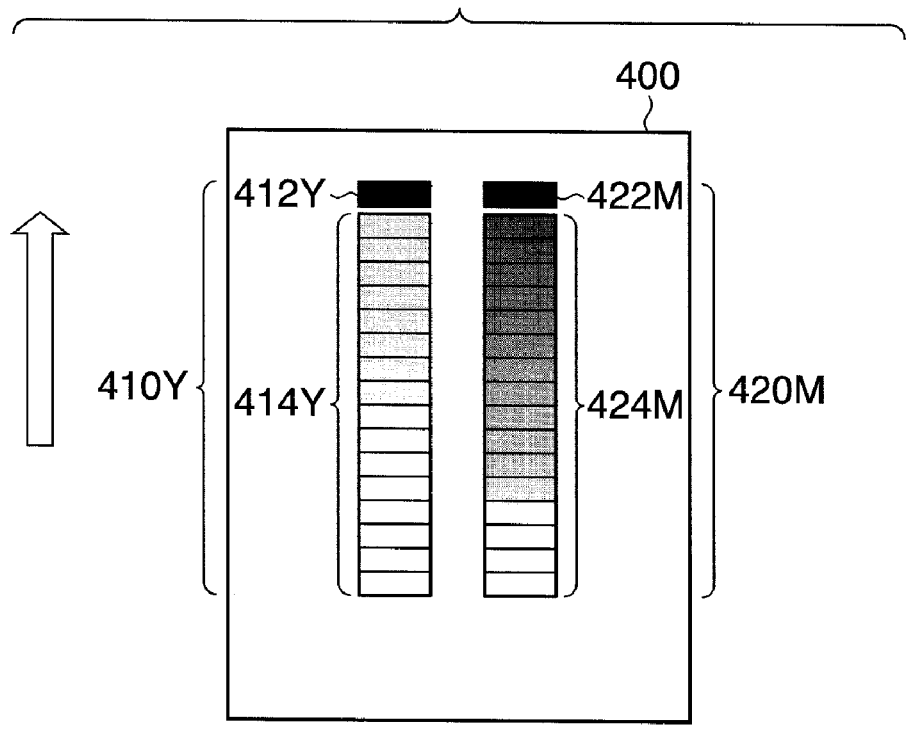
FIGS. 5A and 5B show the detailed configurations of patch images formed on a print sheet shown in FIG. 4.
Figure 5B:
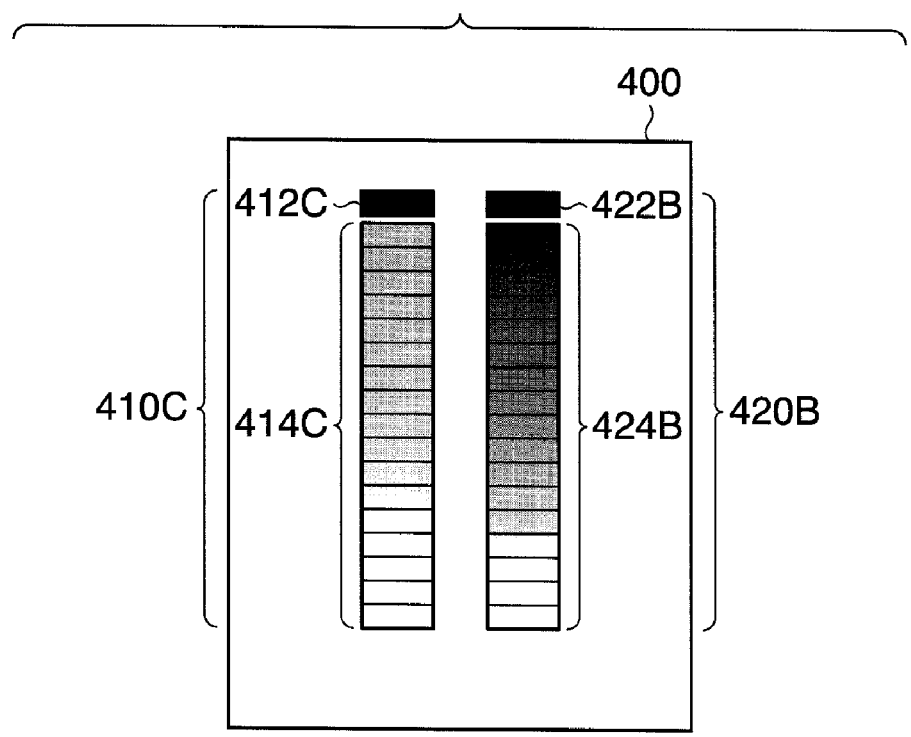

FIGS. 5A and 5B show the detailed configurations of the patch images 410 and 420 formed on the print sheet 400. Note that FIG. 5A shows the print sheet 400 on which a yellow patch image 410Y and magenta patch image 420M of the developing colors are formed. FIG. 5B shows the print sheet 400 on which a cyan patch image 410C and black patch image 420B of the developing colors are formed. The patch images 410Y, 420M, 410C, and 420B respectively have black patch images 412Y, 422M, 412C, and 422B serving as criteria upon reading by the color sensor 152. The patch image 410Y has tone patches 414Y formed by distributing respective yellow densities, and the patch image 420M has tone patches 424M formed by distributing respective magenta densities. Likewise, the patch image 410C has tone patches 414C formed by distributing respective cyan densities, and the patch image 420B has tone patches 424B formed by distributing respective black densities.

These patch images are formed at respective densities in the tone correction control. The tone correction control is generally applied to a plurality of screen patterns, and forms patch images of different densities at respective tone levels. Since the image processing apparatus 100 of this embodiment has a plurality of screen patterns, it applies the yellow and magenta patch images shown in FIG. 5A and the cyan and black patch images shown in FIG. 5B to one screen pattern. Likewise, patch images are formed for each of the plurality of screen patterns of the image processing apparatus 100, and are read by the color sensor 152, thus executing the tone correction control for the plurality of screen patterns. These patch images are stored in the image storage unit 305 shown in FIG. 3, and patch images to be output from the image storage unit 305 are controlled according to an instruction of the image control unit 302.

Combinations of screen patterns are decided depending on the image processing modes of the image processing apparatus 100. Such combinations will be described below with reference to FIGS. 6A and 6B, FIGS. 7A and 7B, and FIG. 8. Note that windows shown in FIGS. 6A and 6B, FIGS. 7A and 7B, and FIG. 8 are all displayed on the display unit 201 of the operation unit 200.

Figure 6A:
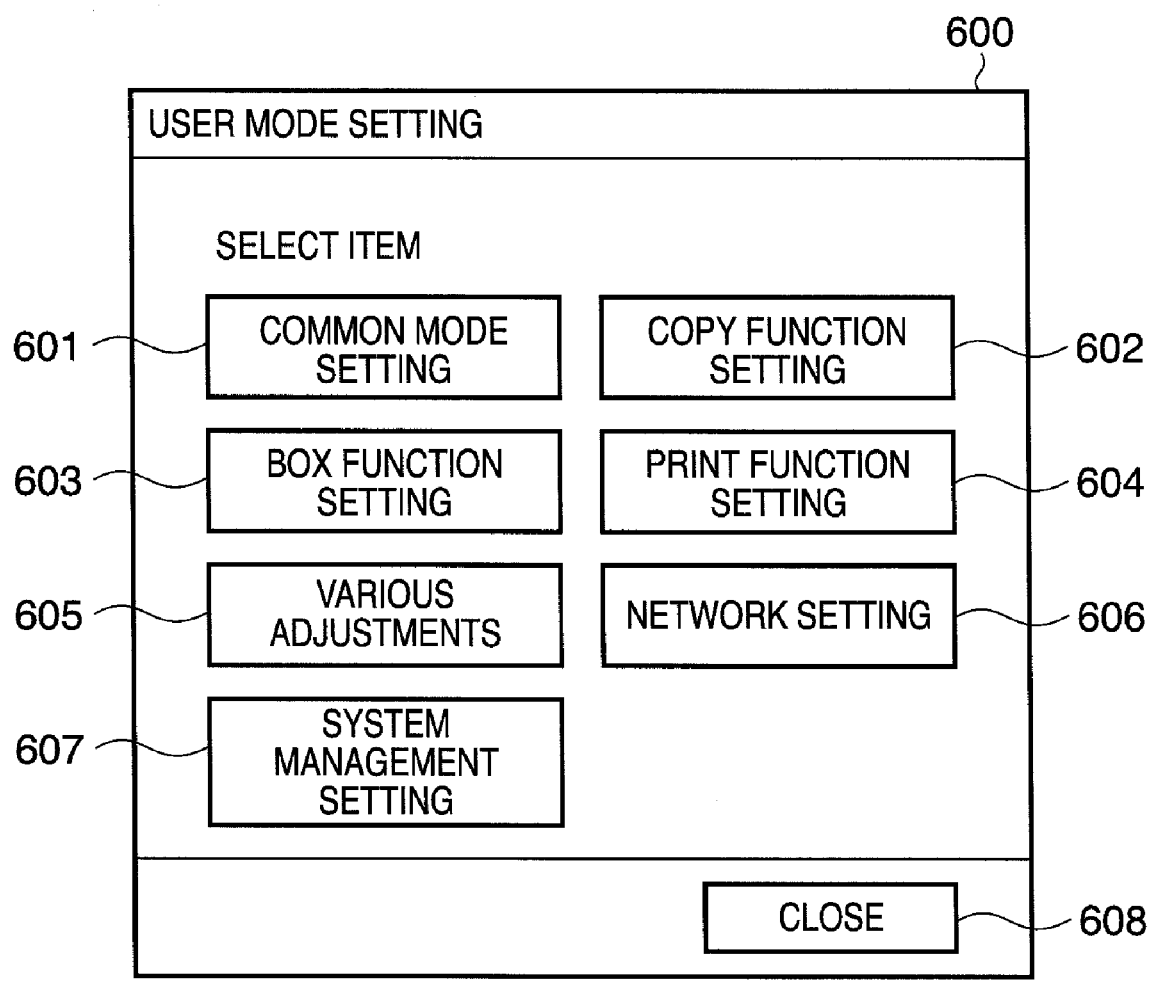
FIG. 6A shows a user mode window used to decide an image processing mode.

FIG. 6A shows a user mode setting window 600 used to decide an image processing mode. The user mode setting window 600 includes a common mode setting button 601, copy function setting button 602, box function setting button 603, and print function setting button 604. Furthermore, the user mode setting window 600 includes a various adjustment button 605, network setting button 606, system management setting button 607, and close button 608.

The common mode setting button 601 is selected when the user wants to set a mode common to the image processing apparatus 100. The settings of the mode common to the image processing apparatus 100 include, for example, registration of types of print sheets stocked in the paper cassettes 133 to 136, and the like. The copy function setting button 602 is selected when the user wants to set functions associated with copying. The settings of the functions associated with copying include, for example, an image direction priority setting used to decide the direction of an image (whether the top of an image is the leading or the trailing edge when entering) upon copying, an image processing mode setting that designates a screen pattern in correspondence with a given image processing mode, and the like. The box function setting button 603 is selected when the user creates a box used to store an image in the image storage unit 305, and decides the size of that box and the like. The print function setting button 604 is selected when the user decides operations without any designations upon printing out an image from a host computer by the image processing apparatus 100. The various adjustment button 605 is selected when the user makes various adjustments of the image processing apparatus 100. Various adjustments of the image processing apparatus 100 include, for example, an adjustment of a mode for activating a cleaning mode of the primary charger 112 and the like. The network setting button 606 is selected when the user makes network settings of the image processing apparatus 100. The network settings include, for example, a setting of the IP (Internet Protocol) address, and the like. The system management setting button 607 is selected when the user sets the name of the image processing apparatus 100 on the network, a password for an administrator, and the like. The close button 608 is selected when the user wants to exit the user mode setting window 600.

Figure 6B:
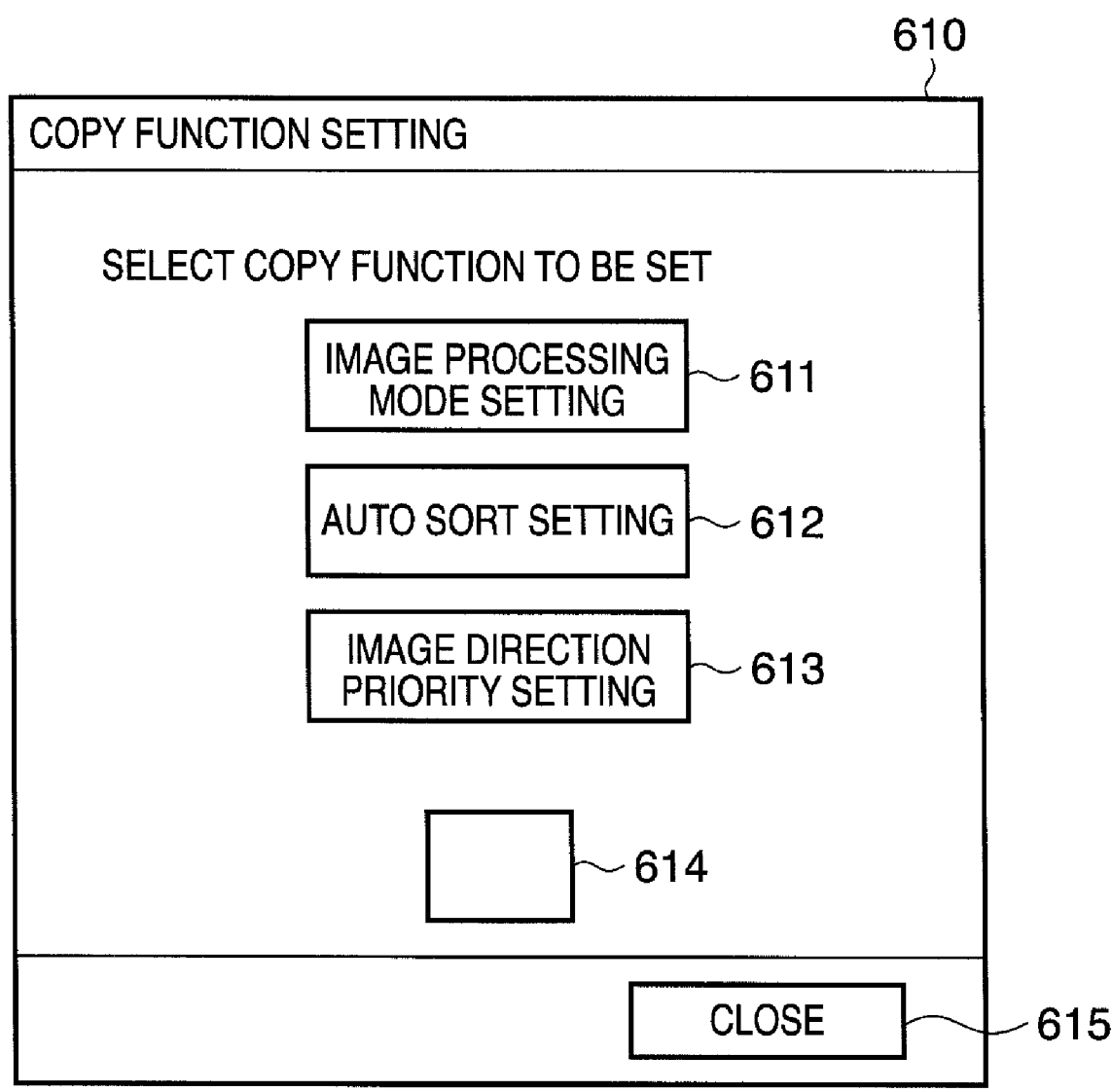
FIG. 6B shows a copy function setting window upon selection of a copy function setting button on the user mode setting window shown in FIG. 6A.

FIG. 6B shows a copy function setting window 610 displayed upon selection of the copy function setting button 602 on the user mode setting window 600. The copy function setting window 610 includes an image processing mode setting button 611, auto sort setting button 612, image direction priority setting button 613, scroll button 614, and close button 615.

The image processing mode setting button 611 is selected when the user designates a screen pattern in the image processing mode. The auto sort setting button 612 is selected when the user decides whether or not a sort mode is automatically enabled upon placing documents on the ADF (Auto Document Feeder) 170. The image direction priority setting button 613 is selected when the user decides the direction of an image (whether the top of an image is the leading or the trailing edge when entering) upon copying a document image. The scroll button 614 is selected when the user wants to designate buttons used to make settings associated with copy functions other than the image processing setting button 611, auto sort setting button 612, and image direction priority setting button 613. The close button 615 is selected when exiting the copy function setting button 610 and returning to the user mode setting window 600.

The image processing mode setting window and the settings of screen patterns in respective image processing modes upon selection of the image processing mode setting button 611 on the copy function setting window 610 will be described below with reference to FIGS. 7A and 7B.

Figure 7A:
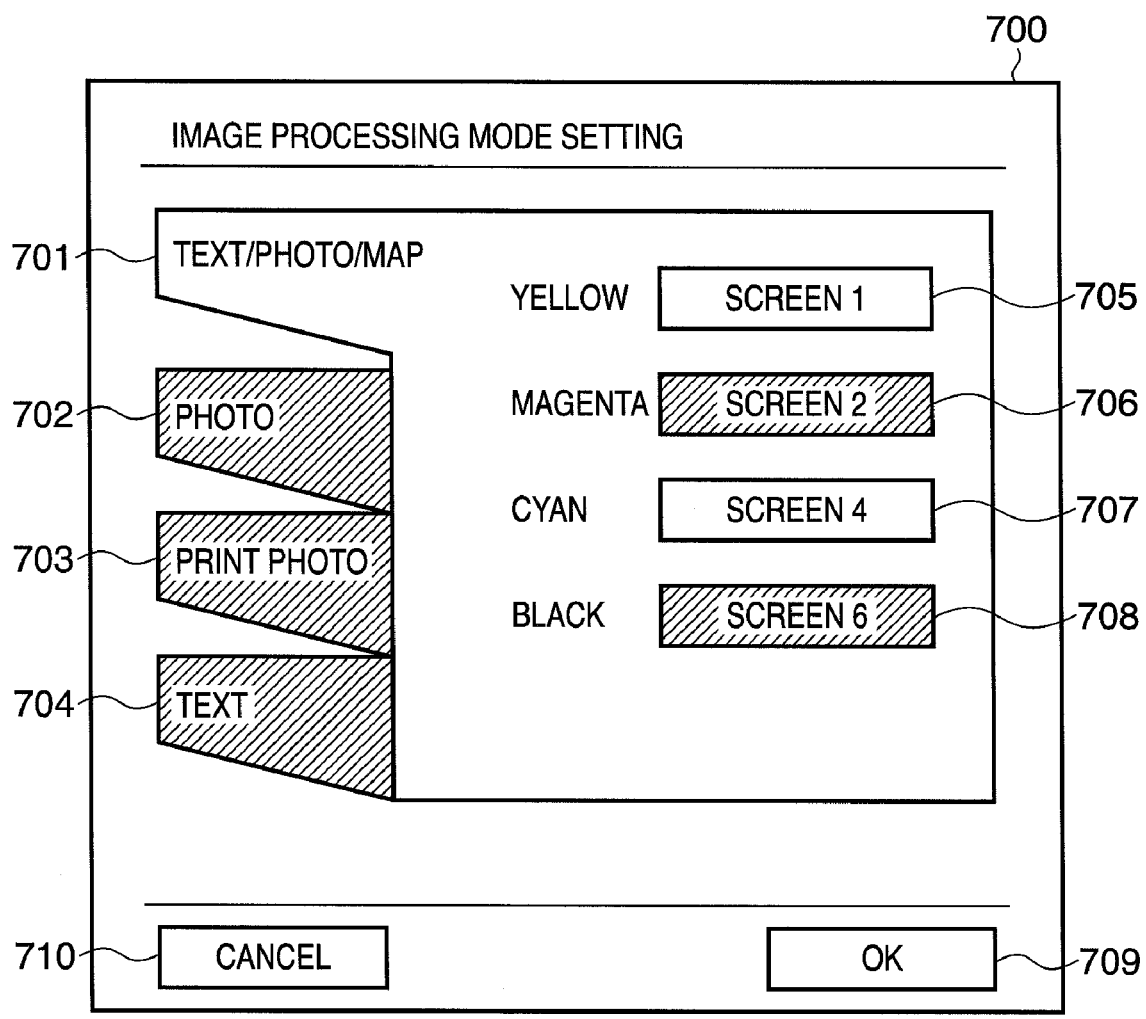
FIG. 7A shows an image processing mode setting window upon selection of an image processing mode setting button on the user mode setting window shown in FIG. 6A.
Figure 7B:
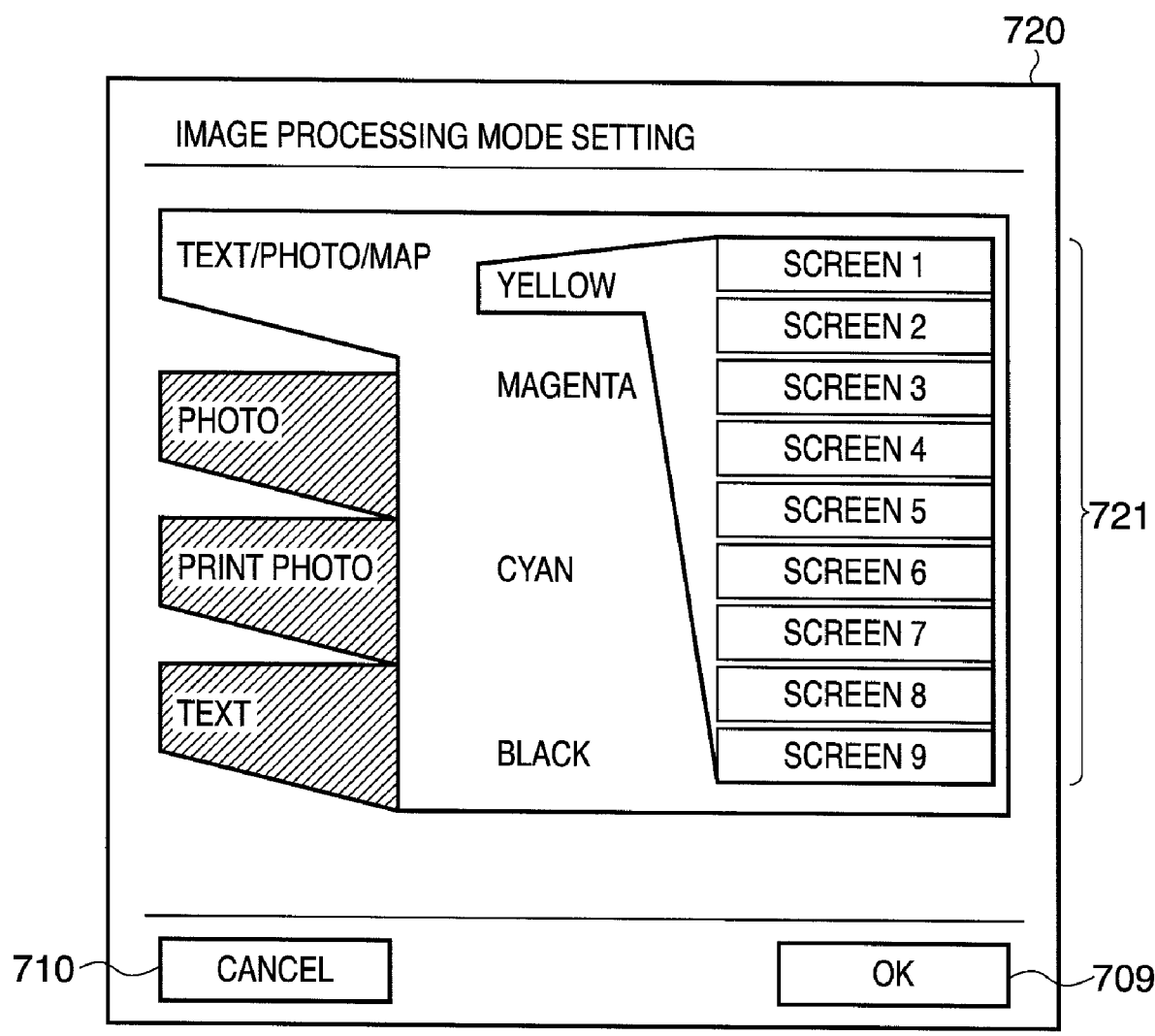
FIG. 7B shows an image processing mode setting window upon selection of a text/photo/map mode and a yellow selection button on the image processing mode setting window shown in FIG. 7A.

FIG. 7A shows an image processing mode setting window 700 upon selection of the image processing mode setting button 611 on the copy function setting window 610. The image processing mode setting window 700 includes image processing mode selection tabs each of which is used to select one of a plurality of image processing modes. In this embodiment, the image processing mode selection tabs include a text/photo/map mode tab 701, photo mode tab 702, print photo mode tab 703, and text mode tab 704. That is, the image processing apparatus 100 has four image processing modes, i.e., a text/photo/map mode, photo mode, print photo mode, and text mode, and can execute image processing in an image processing mode according to the attribute of an image which is to undergo the image processing. The operation unit 200 serving as a selector selects some of a plurality of screen patterns according to developing colors for each image processing mode in response to a user's operation. In FIG. 7A, the text/photo/map mode tab 701 is selected, and screen patterns according to the developing colors (yellow, magenta, cyan, and black) are selected. In FIG. 7A, screen 1 is selected as a yellow screen pattern, as indicated by a selection box 705, and screen 2 is selected as a magenta screen pattern, as indicated by a selection box 706. Likewise, screen 4 is selected as a cyan screen pattern, as indicated by a selection box 707, and screen 6 is selected as a black screen pattern, as indicated by a selection box 708. In this way, the selection boxes 705 to 708 indicate screen patterns which are selected in correspondence with the developing colors.

The image processing mode setting window 700 also includes an OK button 709 and cancel button 710. The OK button 709 is selected when the user settles the settings on the image processing mode setting window 700. The cancel button 710 is selected when the user cancels the settings on the image processing mode setting window 700. Upon selection of the cancel button 710, the window display returns to the copy function setting window 610.

FIG. 7B shows an image processing mode setting window 720 upon selection of the text/photo/map mode and the yellow selection box 705 on the image processing mode setting window 700 shown in FIG. 7A. Screens 1 to 9 are available as screen patterns which can be selected for yellow, as indicated by a list display area 721, and the user can select one of screens 1 to 9 by pressing it as a button. That is, the list display area 721 displays a list of a plurality of screen patterns from which the user can make a selection. Note that the list display area 721 can identifiably display screen patterns that have not yet undergone the tone correction control from those which have undergone the tone correction control. For example, the list display area 721 displays screen patterns which have undergone the tone correction control using an outline form, and those which have not yet undergone the tone correction control using a hatched form. A screen pattern selected on the image processing mode setting window 720 (list display area 721) is set as a yellow screen pattern. When the user selects one of screen patterns 1 to 9 in correspondence with one developing color, the window display is switched to display of the image processing mode setting window 700 which displays one screen pattern per developing color. As described above, by selecting the OK button 709, the screen pattern for that image processing mode is settled.

Figure 8:
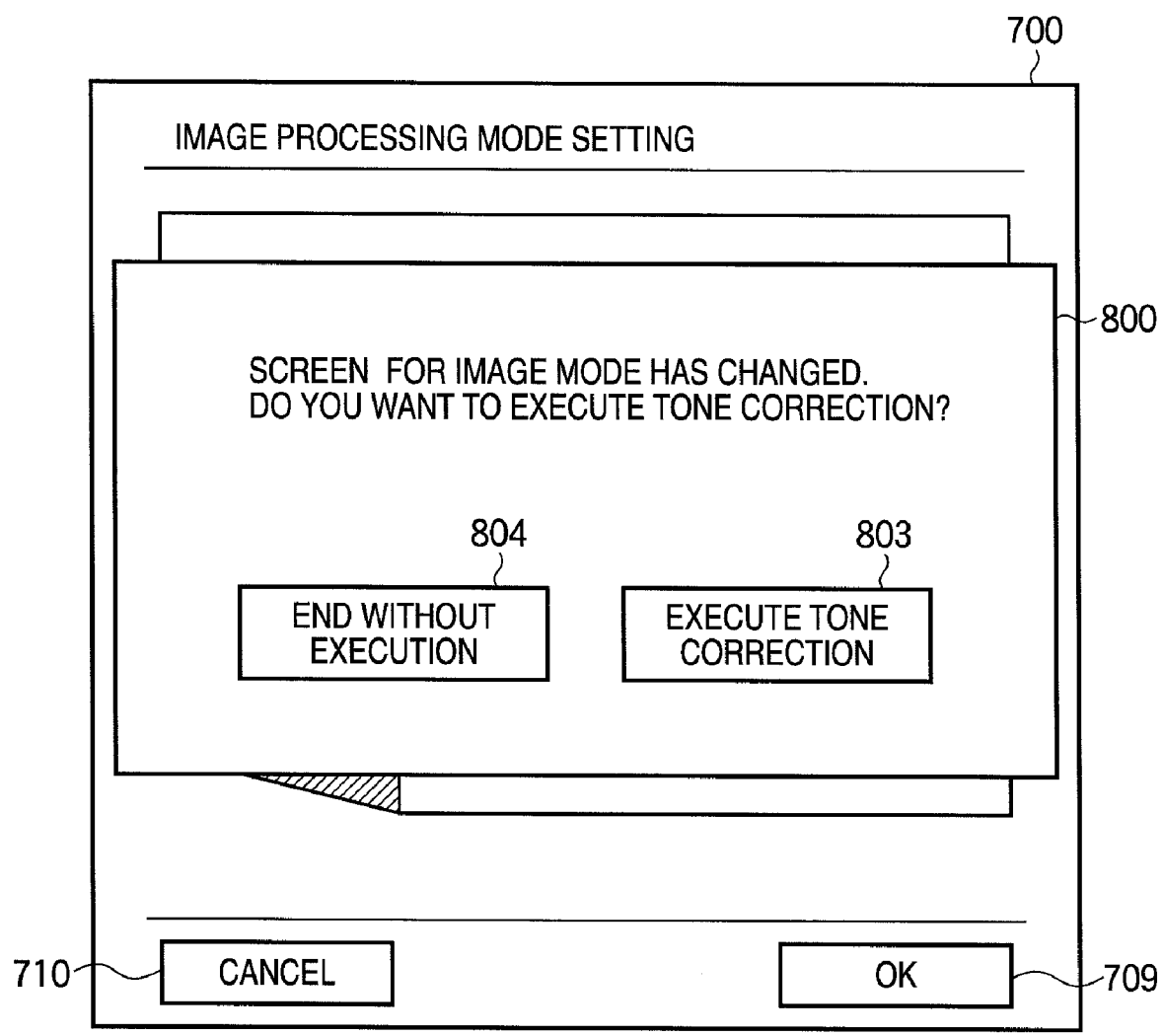
FIG. 8 shows an alert dialog displayed when a screen pattern which has not undergone tone correction control yet on the image processing mode setting window shown in FIG. 7B.

FIG. 8 shows an alert dialog 800 displayed when the user selects a screen pattern which has not undergone the tone correction control on the image processing mode setting window 720 shown in FIG. 7B. The display unit 201 of the operation unit 200 serves as a notification unit which notifies, when the determination unit 317 determines that the selected screen pattern has not undergone the tone correction control yet, a message that advises accordingly (alert dialog 800). Upon changing a screen pattern, since a new combination of screen patterns is formed, a new combination of patch images shown in FIGS. 5A and 5B is also formed. Therefore, when a screen pattern is changed by a user's operation, the determination unit 317 determines whether or not the tone correction control has been executed. If the tone correction control has not been executed yet, the display unit 201 of the operation unit 200 displays the alert dialog 800. When the elapsed time period after the previous tone correction control is long, and the determination unit 317 determines that the tone correction control is required, a message that advises accordingly may be displayed in the same manner as the alert dialog 800.

The alert dialog 800 is a message dialog which displays a message indicating that the selected screen pattern has not undergone the tone correction control yet, and has a tone correction control execution button 803 and end button 804. The tone correction control execution button 803 and end button 804 are used to make the user select whether or not to apply the tone correction control to the selected screen pattern. When the tone correction control is to be applied, the user selects the tone correction control execution button 803 to apply the tone correction control to the selected screen pattern. In this manner, the tone correction control execution button 803 serves as a display unit which accepts a tone correction control instruction. Also, the image processing apparatus 100 has an execution unit which executes the tone correction control for the selected screen pattern when the user inputs the tone correction control instruction. When the user does not want to execute the tone correction control to the selected screen pattern, he or she selects the end button 804. In this way, the alert dialog 800 is cleared, and the window display returns to the image processing mode setting window 700. In this case, the OK button 709 on the image processing mode setting window 700 is, e.g., hatched and can no longer be selected. Note that hatched screen patterns on the list display area 721 (i.e., those which have not undergone the tone correction control yet) may be inhibited from being selected.

As described above, the image processing apparatus 100 of this embodiment checks if the tone correction control is applied to the screen pattern selected by the user. If the tone correction control has not been applied yet, the apparatus 100 displays a message that advises accordingly. Also, the apparatus 100 prompts the user to execute the tone correction control for the screen pattern that has not undergone the tone correction control yet. In this way, the image processing using the screen pattern that has not undergone the tone correction control yet can be prevented from being executed. Therefore, the image processing apparatus 100 can prevent any image quality drop due to execution of the image processing using the screen pattern which has not undergone the tone correction control yet.

The operation of the image processing apparatus 100 will be described below with reference to FIG. 9. Note that the operation of the image processing apparatus 100 (screen pattern change processing) executed when the user selects the image processing mode setting button 611 on the copy function setting window 610 will be described.

Figure 9:
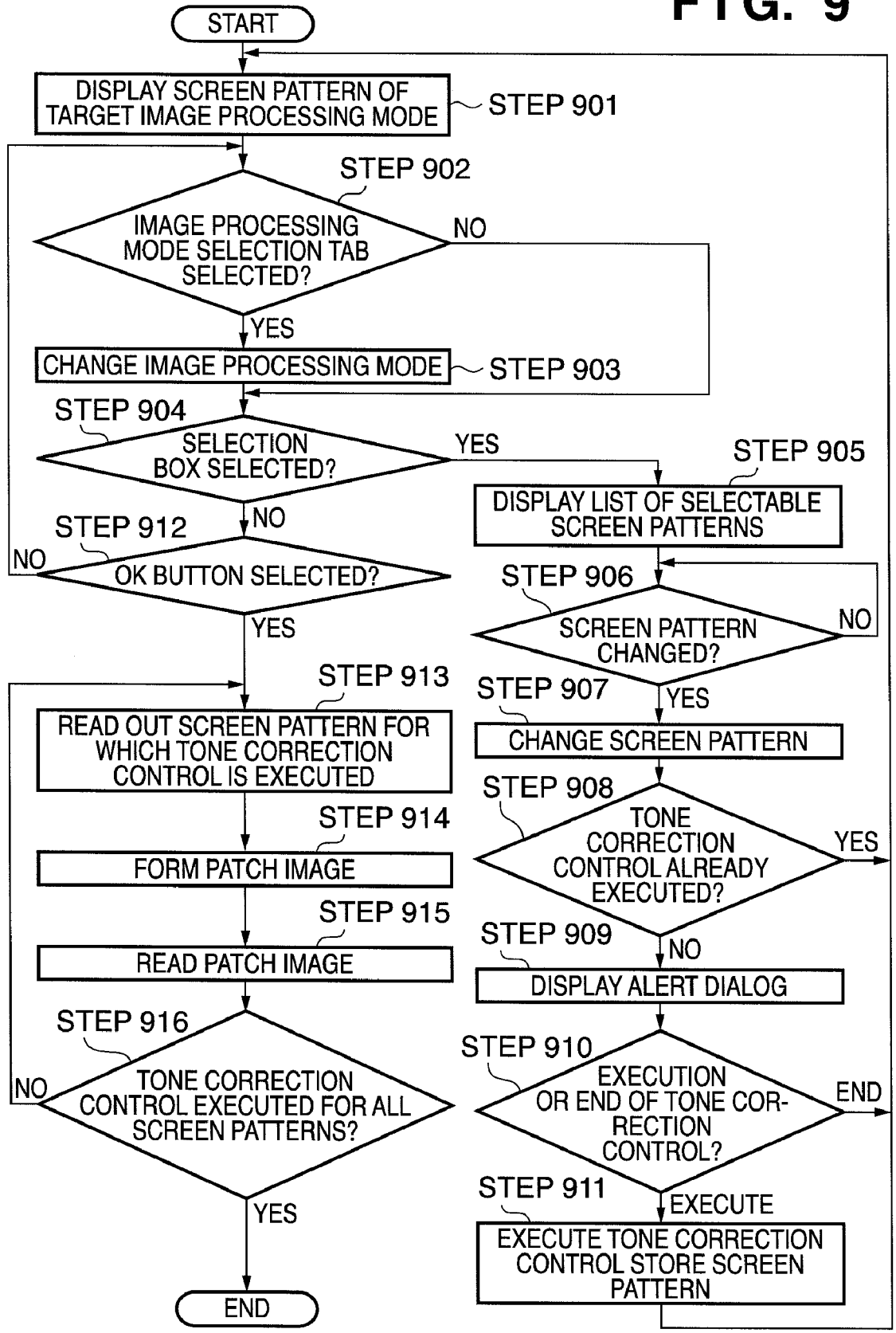
FIG. 9 is a flowchart for explaining the operation (screen pattern change processing) of the image processing apparatus shown in FIG. 1.

Referring to FIG. 9, when the user selects the image processing mode setting button 611, the display unit 201 of the operation unit 200 displays screen patterns of the target image processing mode in step S901. More specifically, the display unit 201 of the operation unit 200 displays the image processing mode setting window 700 shown in FIG. 7A. The operation unit 200 checks in step S902 if the user selects the image processing mode selection tab. More specifically, the operation unit 200 monitors if the user selects one of the text/photo/map mode tab 701, photo mode tab 702, print photo mode tab 703, and text mode tab 704.

If the operation unit 200 judges in step S902 that the user selects the image processing mode selection tab, it changes the image processing mode to that corresponding to the image processing mode selection tab selected in step S902 in step S903, and the process advances to step S904. On the other hand, if the operation unit 200 judges that the user does not select any image processing mode selection tab, the process jumps to step S904.

The operation unit 200 checks in step S904 if the user selects one of the selection boxes 705 to 708 used to select a screen pattern. If the operation unit 200 judges in step S904 that the user selects one of the selection boxes 705 to 708, the process advances to step S905, and the display unit 201 displays a list of selectable screen patterns on the list display area 721. More specifically, the display unit 201 displays the image processing mode setting window 720 shown in FIG. 7B. The operation unit 200 then checks in step S906 if the user changes a screen pattern. More specifically, the operation unit 200 monitors if the user selects a screen pattern from a plurality of screen patterns displayed on the list display area 721 in step S905.

If the operation unit 200 judges in step S906 that the user changes a screen pattern, the process advances to step S907 to change the current screen pattern to that selected in step S906. On the other hand, if the operation unit 200 judges in step S906 that the user does not change a screen pattern, it repeats the process of checking if the user has changed a screen pattern.

The determination unit 317 checks in step S908 if the screen pattern changed in step S907 has already undergone the tone correction control. More specifically, the determination unit 317 refers to the database 317a shown in FIG. 3B to check if the screen pattern changed in step S907 has undergone the tone correction control.

If the determination unit 317 determines in step S908 that the screen pattern changed in step S907 has already undergone the tone correction control, the process returns to step S901. On the other hand, if the determination unit 317 determines that the screen pattern changed in step S907 has not undergone the tone correction control yet, the process advances to step S909, and the display unit 201 of the operation unit 200 displays the alert dialog 800 shown in FIG. 8.

The operation unit 200 checks in step S909 if the user wants to apply the tone correction control to the screen pattern or to end the process without applying the tone correction control. More specifically, the operation unit 200 monitors if the user selects, on the alert dialog 800, the tone correction control execution button 803 used to execute the tone correction control or the end button 804 used to end the process without executing the tone correction control.

If the operation unit 200 judges in step S910 that the user wants to apply the tone correction control to the screen pattern, the process advances to step S911, and the determination unit 317 stores the screen pattern to which the tone correction control is to be applied. More specifically, the determination unit 317 writes the screen pattern to which the tone correction control is to be applied in the database 317b shown in FIG. 3C. On the other hand, if the determination unit 317 judges that the user wants to end the process without executing the tone correction control, the process returns to step S901. Note that a plurality of screen patterns to which the tone correction control is to be applied are written in the database 317b by repeating steps S901 to S911.

Referring back to step S904, if the operation unit 200 judges that the user has not selected any of the selection boxes 705 to 708, the process advances to step S912, and the operation unit 200 checks if the user selects the OK button 709 on the image processing mode setting window 700. In other words, the operation unit 200 checks if the user settles the screen patterns for the image processing mode.

If the operation unit 200 judges in step S912 that the user has not selected the OK button 709, the process returns to step S902. On the other hand, if the operation unit 200 judges that the user has selected the OK button 709, the process advances to step S913, the print control unit 311 reads out screen patterns to which the tone correction control is to be applied. More specifically, the print control unit 311 reads out the database 317b created by the determination unit 317.

In step S914, the print control unit 311 forms patch images shown in FIGS. 5A and 5B. In step S915, the color sensor 152 reads the patch images formed in step S914, and the print control unit 311 executes tone correction based on the read result.

The print control unit 311 checks in step S916 if the tone correction control is applied to all the screen patterns written in the database 317b. If the print control unit 317 judges that the tone correction control is applied to all the screen patterns, it ends the screen pattern change processing; otherwise, the process returns to step S913.

As described above, according to the screen pattern change processing by the image processing apparatus 100 of this embodiment, a message indicating that no tone correction control is applied is notified for each screen pattern, and the tone correction control can be applied to a plurality of screen patterns at the same time.

As described above, the image processing apparatus according to the present invention checks using the determination unit if a screen pattern selected via the operation unit has undergone the tone correction control. If the determination unit determines that the selected screen pattern has not undergone the tone correction control, the display unit of the operation unit displays the alert dialog that advises accordingly. Therefore, an image quality drop caused when the user unknowingly uses, in the image processing, a screen pattern, which has not undergone the tone correction control, can be prevented. By displaying the alert dialog including the tone correction control execution button used to execute the tone correction control, the apparatus can prompt the user to execute the tone correction control for the screen pattern that has not undergone that control. Furthermore, by identifiably displaying, on the list display area, screen patterns which have not undergone the tone correction control and those which have undergone the tone correction control, a screen pattern which has not undergone the tone correction control yet can be prevented from being selected.

The image processing apparatus according to the present invention checks, using the determination unit, if the tone correction control is required according to the elapsed time period after the previous tone correction control executed for the screen pattern selected via the operation unit. If the determination unit determines that the tone correction control is required, the display unit of the operation unit displays an alert dialog that advises accordingly. Therefore, a drop in image quality caused when the user uses, in the image processing, a screen pattern for which a long period of time has elapsed after the previous tone correction control, and the effect of the tone correction control deteriorates, can be prevented.

Other Embodiments

The embodiments of the present invention have been explained in detail. The present invention may be applied to either a system constituted by a plurality of devices, or an apparatus consisting of a single device.

Note that the present invention is also achieved by directly or remotely supplying a program that implements the functions of the aforementioned embodiments to a system or apparatus, and reading out and executing the supplied program code by a computer of that system or apparatus. Therefore, the technical scope of the present invention includes the program code itself installed in a computer to implement the functional processes of the present invention using the computer.

In this case, the form of program is not particularly limited, and an object code, a program to be executed by an interpreter, script data to be supplied to an OS, and the like may be used as long as they have the program function.

As a recording medium for supplying the program, for example, a Floppy® disk, hard disk, optical disk, and magneto-optical disk may be used. Also, MO, CD-ROM, CD-R, CD-RW, magnetic tape, nonvolatile memory card, ROM, DVD (DVD-ROM, DVD-R), and the like may be used.

As another use method, a connection is established to the Internet site using a browser of a client PC, and the program itself according to the present invention or a file that further includes an automatic installation function may be downloaded to a recording medium such as a hard disk or the like. Also, the program code that forms the program of the present invention may be segmented into a plurality of files, which may be downloaded from different home pages. That is, the scope of the present invention includes a WWW server which makes a plurality of users download a program required to implement the functional processes of the present invention by the computer.

Furthermore, a storage medium such as a CD-ROM or the like, which stores the encrypted program of the present invention, may be delivered to the users. The user who has cleared a predetermined condition may be allowed to download key information that decrypts the program from a home page via the Internet, and the encrypted program may be executed using that key information to be installed on a computer, thus implementing the present invention.

Moreover, the functions of the aforementioned embodiments can be implemented by some or all of actual processes executed by an OS or the like which runs on a computer based on instructions of the program.

In addition, the scope of the present invention includes a case in which the program according to the present invention is written in a memory of a function expansion unit of a PC, and a CPU equipped on that function expansion unit executes some or all of actual processes.

The preferred embodiments of the present invention has been described. However, the present invention is not limited to these embodiments, and various modifications and changes may be made within the scope of the gist of the invention. For example, when a screen pattern is selected, whether or not the selected screen pattern has undergone the tone correction control may be checked, and whether or not the tone correction control is required may be checked according to the elapsed time period after the previous tone correction control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-350493 filed on Dec. 26, 2006, which is hereby incorporated by reference herein in its entirety.

What is claimed is:

1. An image processing apparatus comprising:

an image processing unit configured to execute image processing by selectively using a plurality of image processing patterns;

a selecting unit configured to select one of the plurality of image processing patterns according to a user's operation;

a determination unit configured to determine whether or not tone correction control has been applied to the image processing pattern selected by the selecting unit; and a notification unit configured to notify, when the determination unit determines that the tone correction control has not been applied yet, by a message that advises accordingly, wherein the determination unit calculates a time period elapsed after previous tone correction control executed for an image processing pattern selected by the selecting unit, and determines whether or not the tone correction control is required according to the elapsed time period, and when the determination unit determines that the tone correction control is required, the notification unit notifies by a message that advises accordingly.

2. An image processing apparatus comprising:

an image processing unit configured to execute image processing by selectively using a plurality of image processing patterns;

a selecting unit configured to select one of the plurality of image processing patterns according to a user's operation;

a determination unit configured to determine whether or not tone correction control has been applied to the image processing pattern selected by the selecting unit; and a notification unit configured to notify, when the determination unit determines that the tone correction control has not been applied yet, by a message that advises accordingly, wherein the notification unit includes a list display unit configured to display a list of the plurality of image processing patterns, and the list display unit identifiably displays an image processing pattern which is determined by the determination unit not to have undergone the tone correction control from an image processing pattern which has undergone the tone correction control.

3. A control method for an image processing apparatus, which executes image processing by selectively using a plurality of image processing patterns, the method comprising:

selecting one of the plurality of image processing patterns according to a user's operation;

determining whether or not tone correction control has been applied to the image processing pattern selected in the selecting step; and notifying, when it is determined in the determining step that the tone correction control has not been applied yet, by a message that advises accordingly wherein the determining step includes calculating a time period elapsed after previous tone correction control executed for an image processing pattern selected by the selecting step, and determining whether or not the tone correction control is required according to the elapsed time period, and when the determining step determines that the tone correction control is required, the notifying step includes notifying by a message that advises accordingly.

* * * * *